J. O. BRADNEY & H. PRIESTER.
MOTOR OPERATED ADJUSTABLE CONVEYER.
APPLICATION FILED NOV. 3, 1917.
1,301,642.
Patented Apr. 22, 1919.
14 SHEETS—SHEET 4.
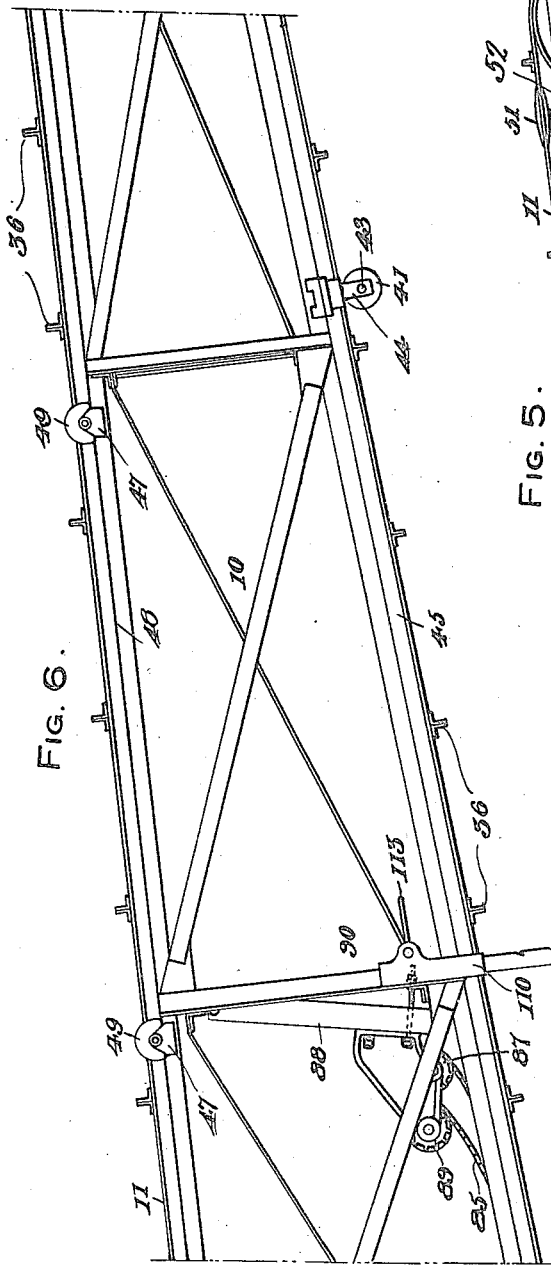
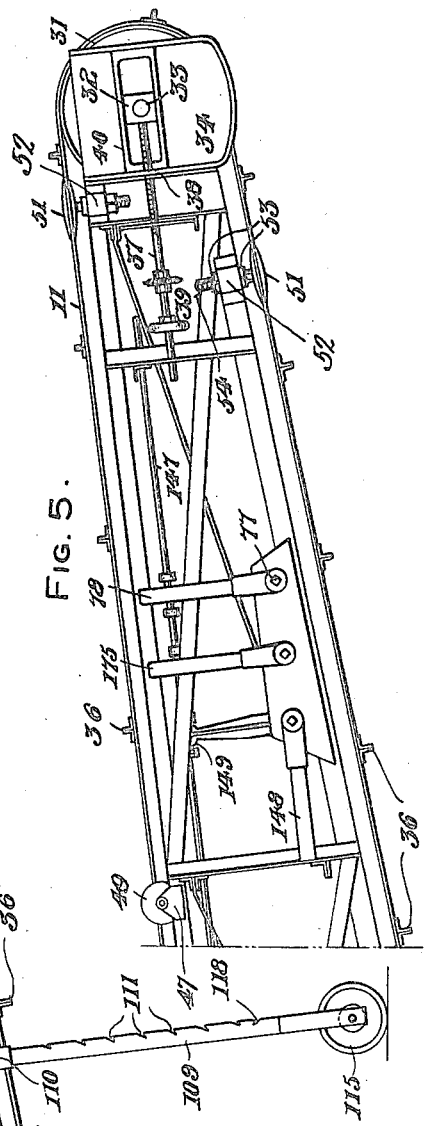
Inventors
J. O. Bradney
H. Priester
By T. A. Bryant
Attorney.

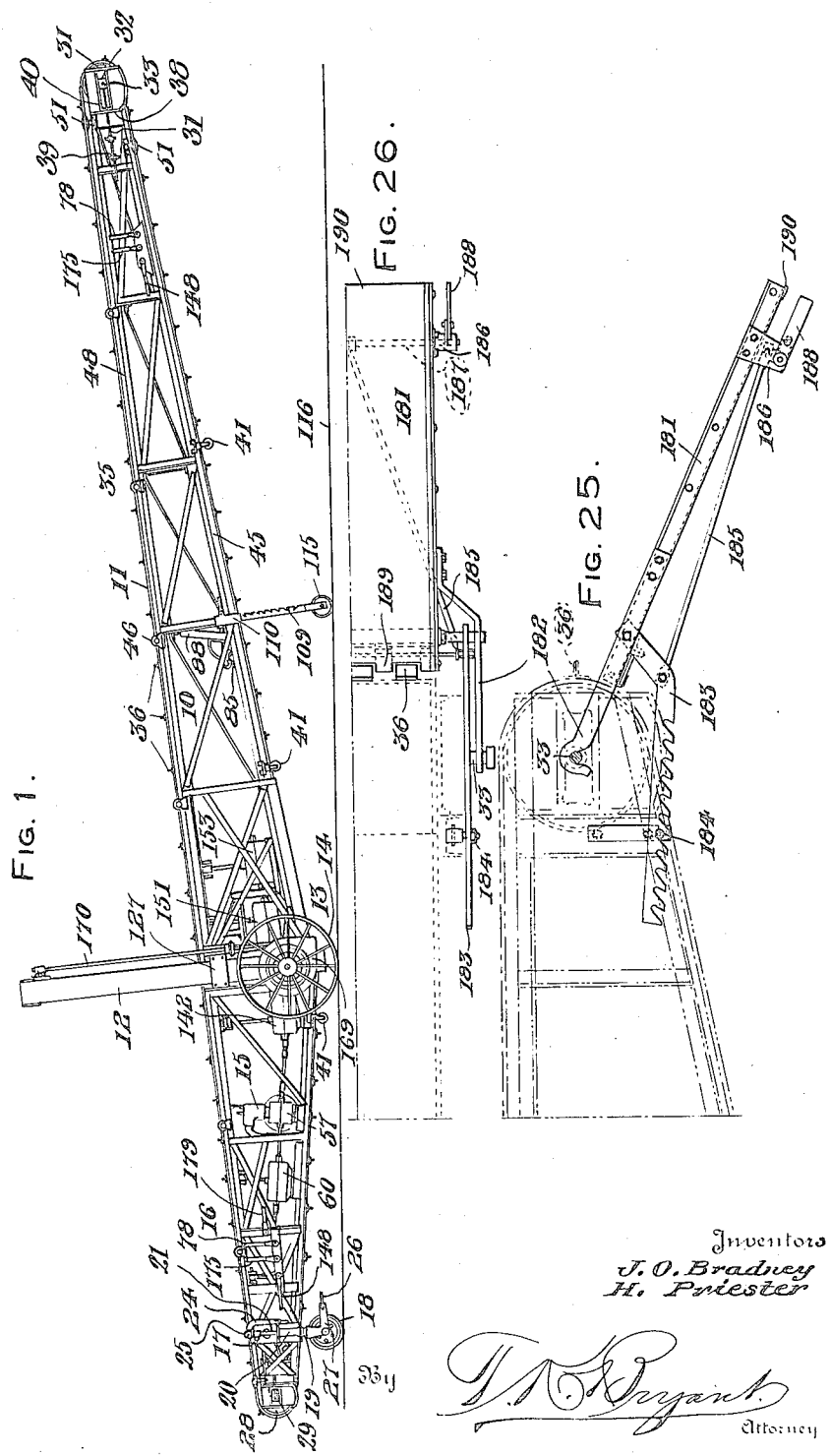

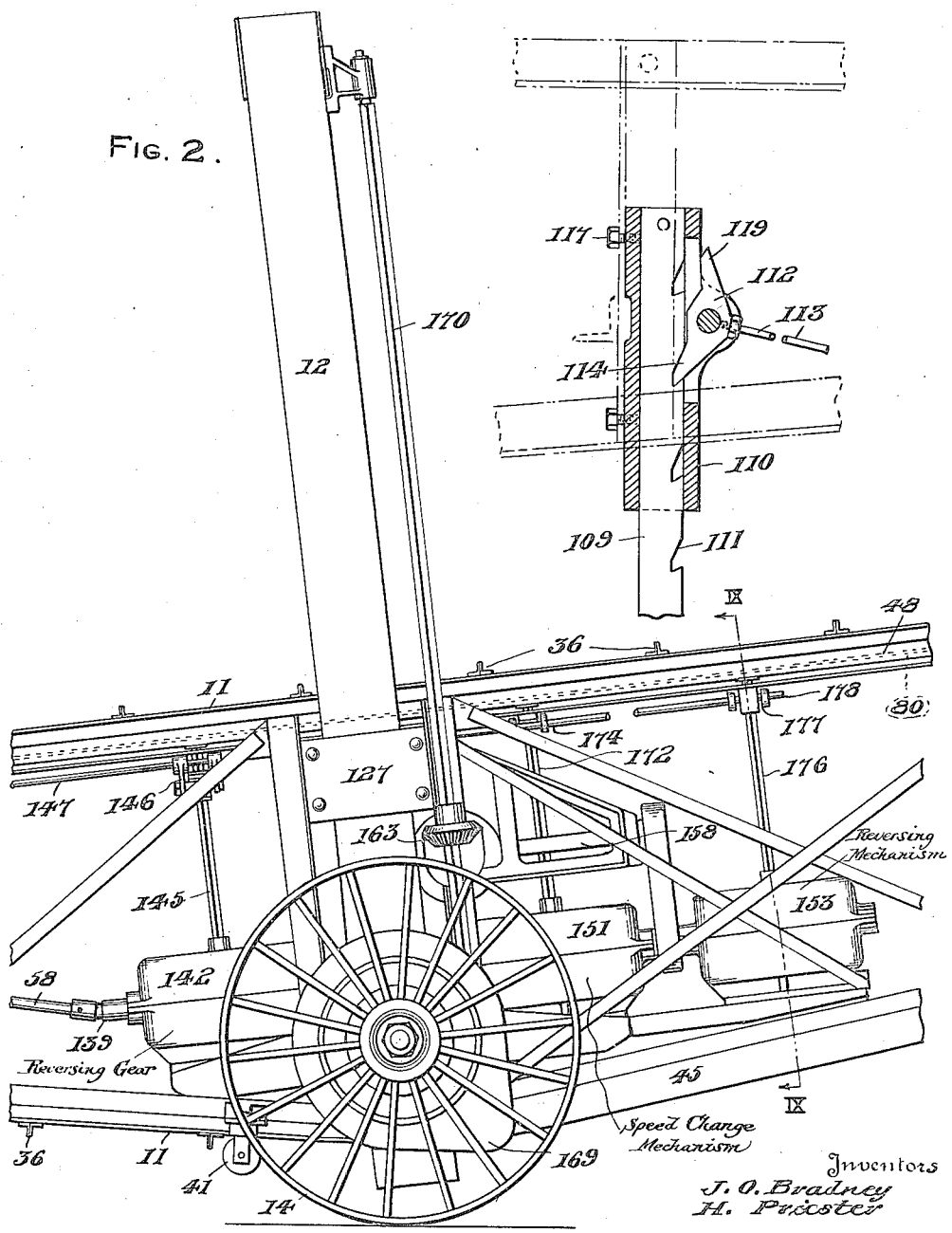

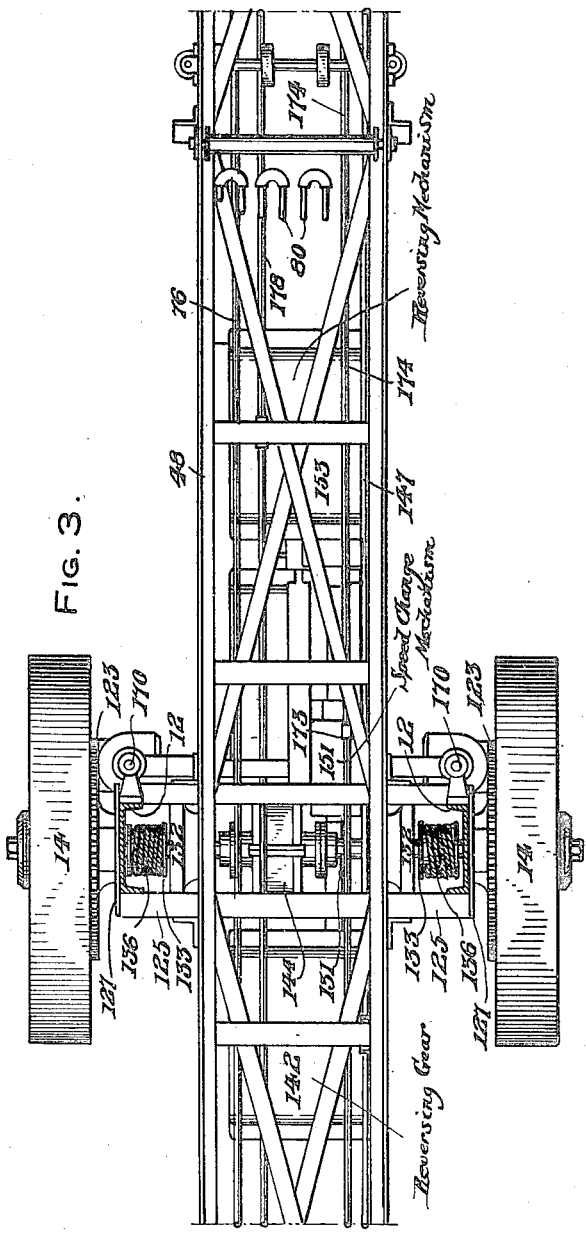

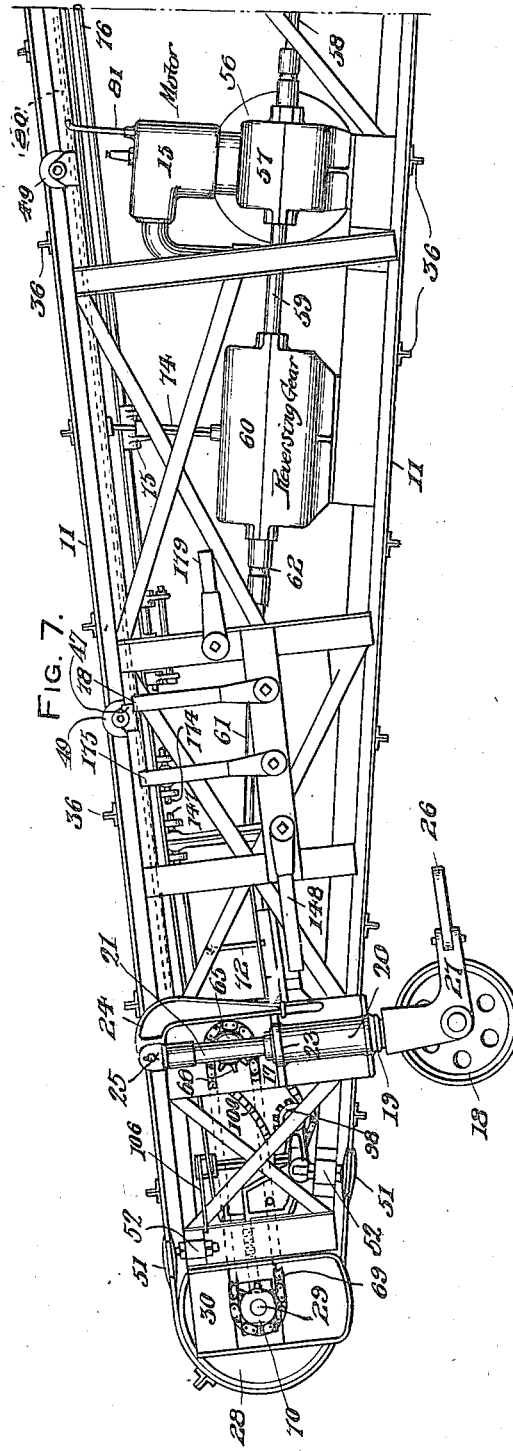

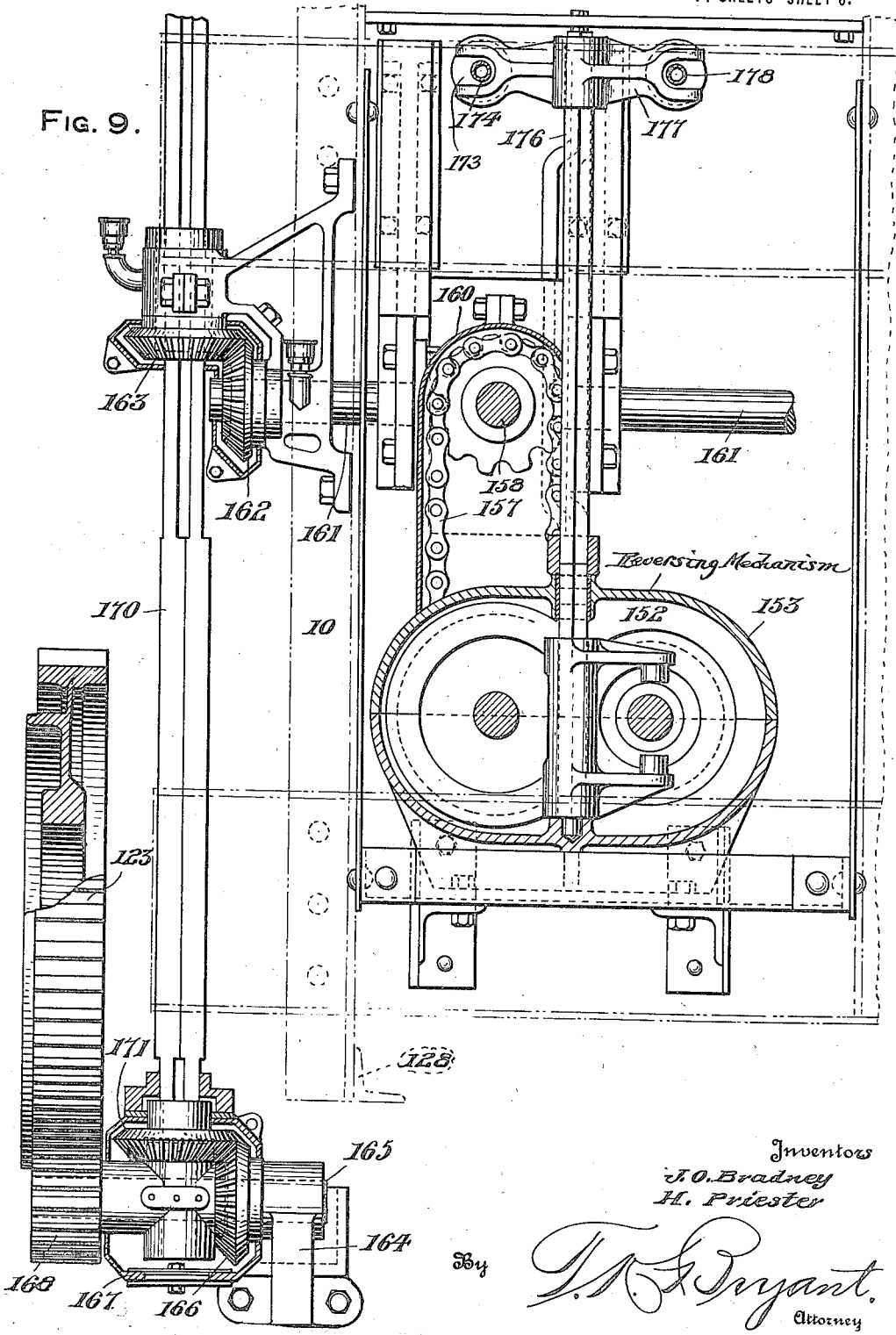

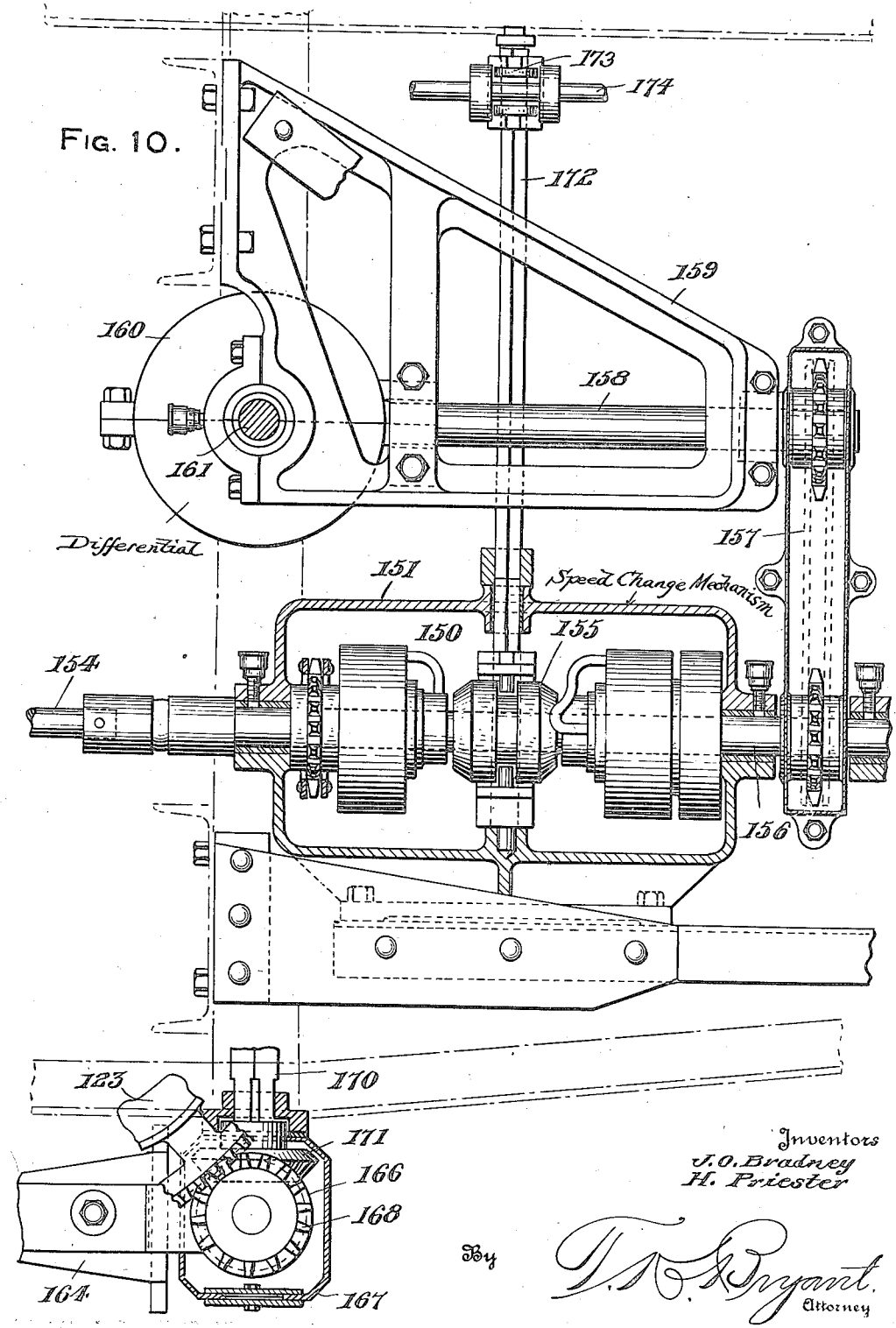

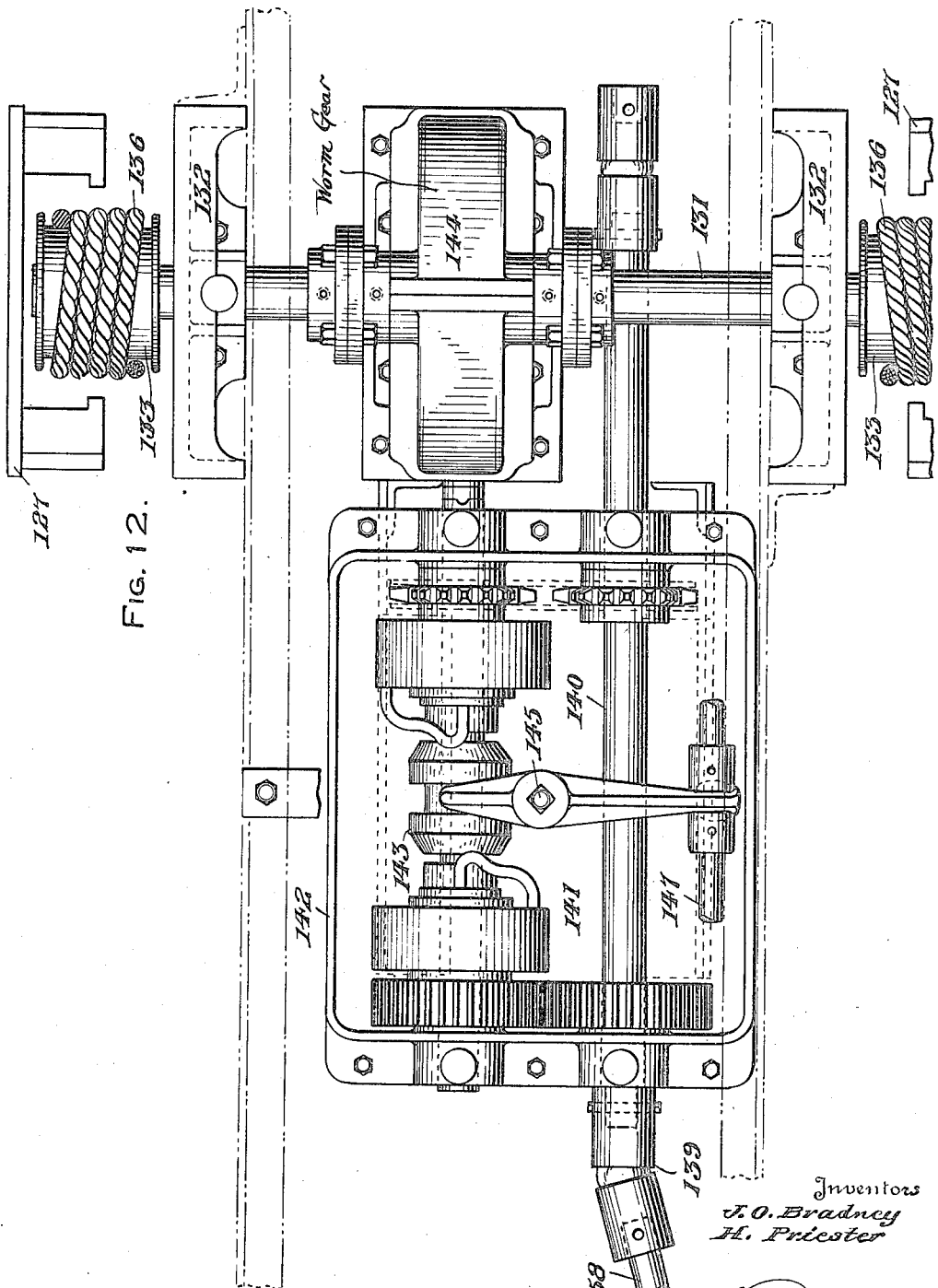

J. O. BRADNEY & H. PRIESTER.
MOTOR OPERATED ADJUSTABLE CONVEYER.
APPLICATION FILED NOV. 3, 1917.
1,301,642.
Patented Apr. 22, 1919.
14 SHEETS—SHEET 10.
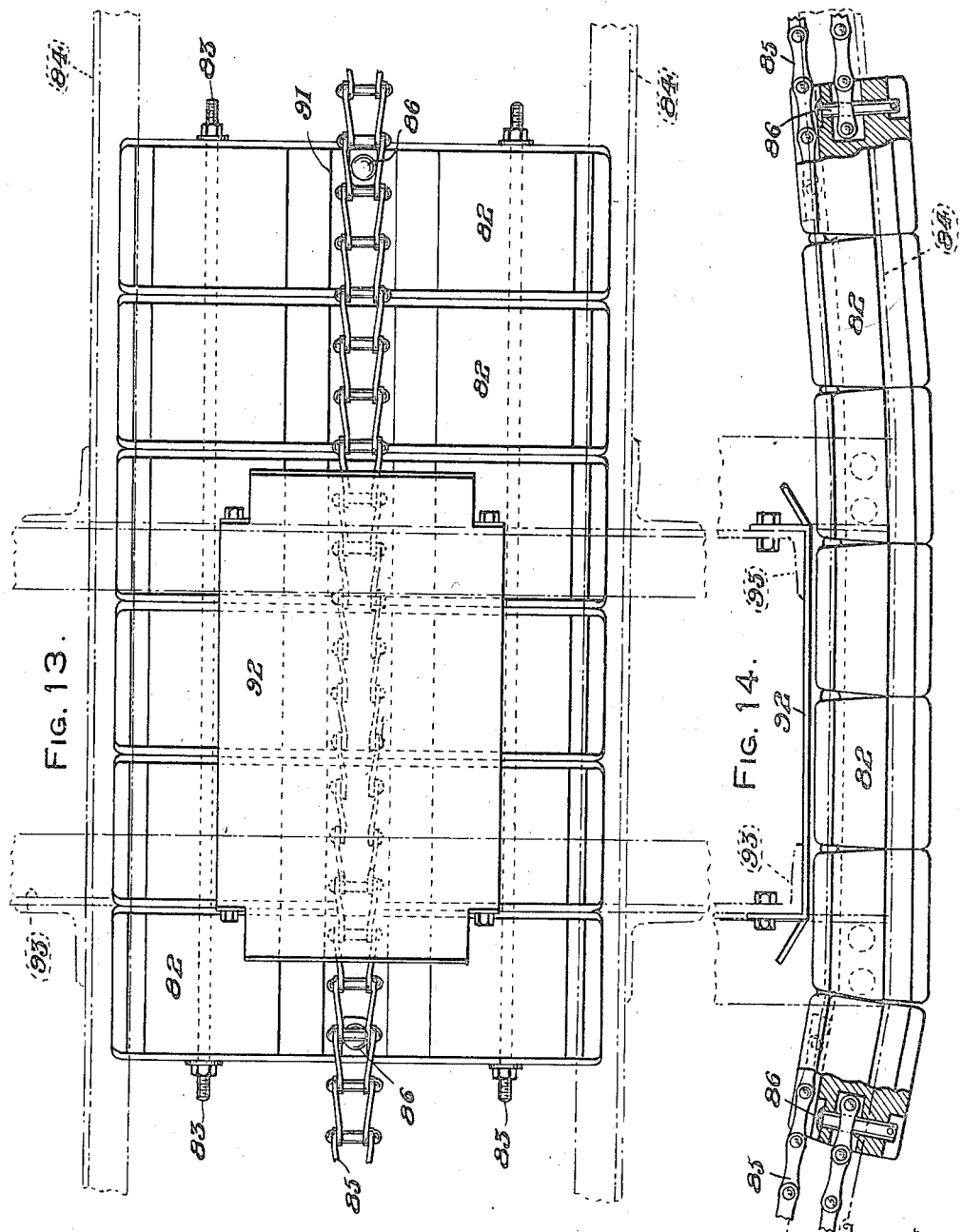
Inventors
J. O. Bradney
H. Priester
By T. K. Bryant
Attorney J. O. BRADNEY & H. PRIESTER.
MOTOR OPERATED ADJUSTABLE CONVEYER.
APPLICATION FILED NOV. 3, 1917.
1,301,642.
Patented Apr. 22, 1919.
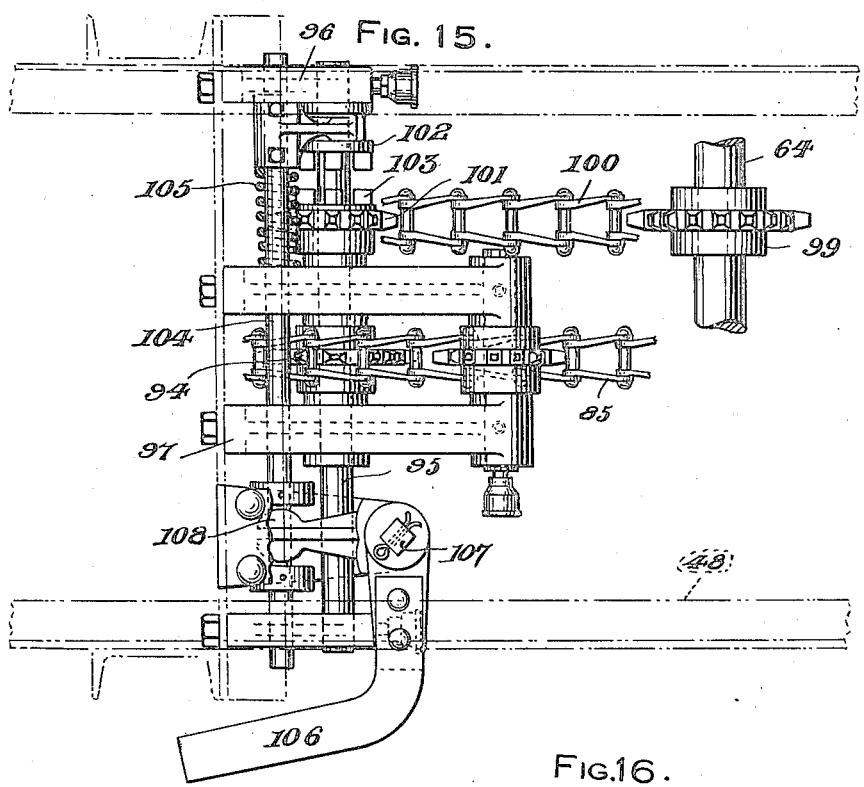
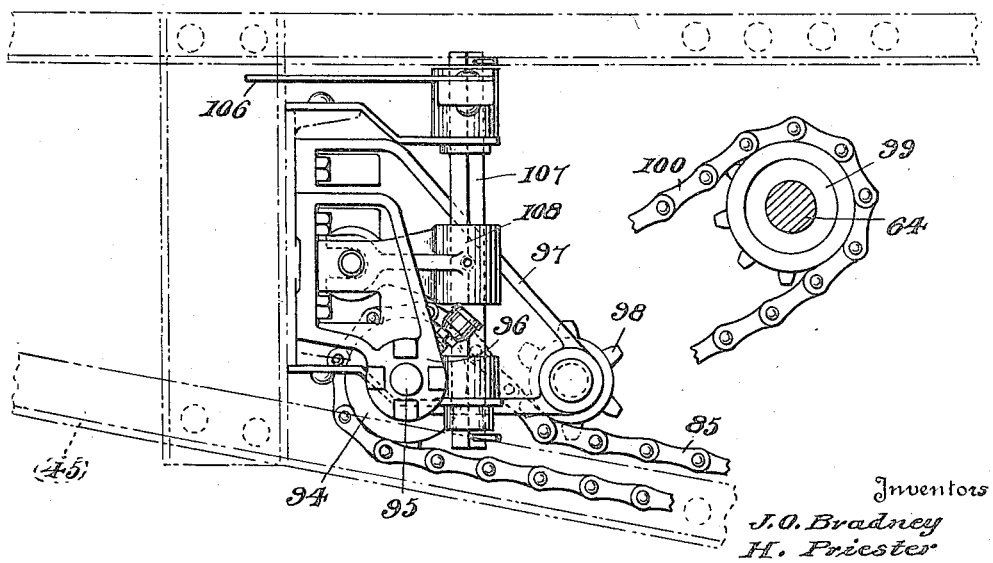

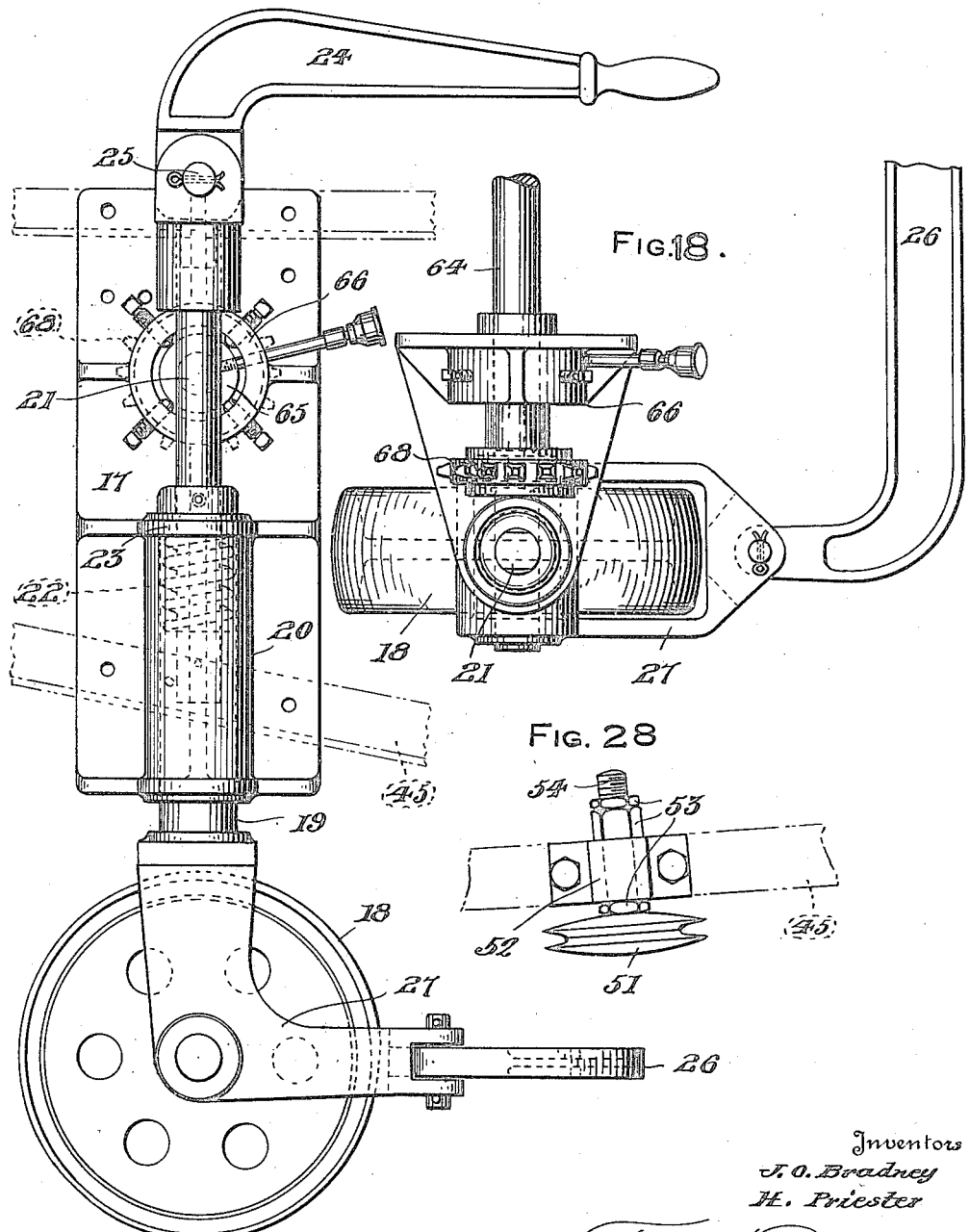

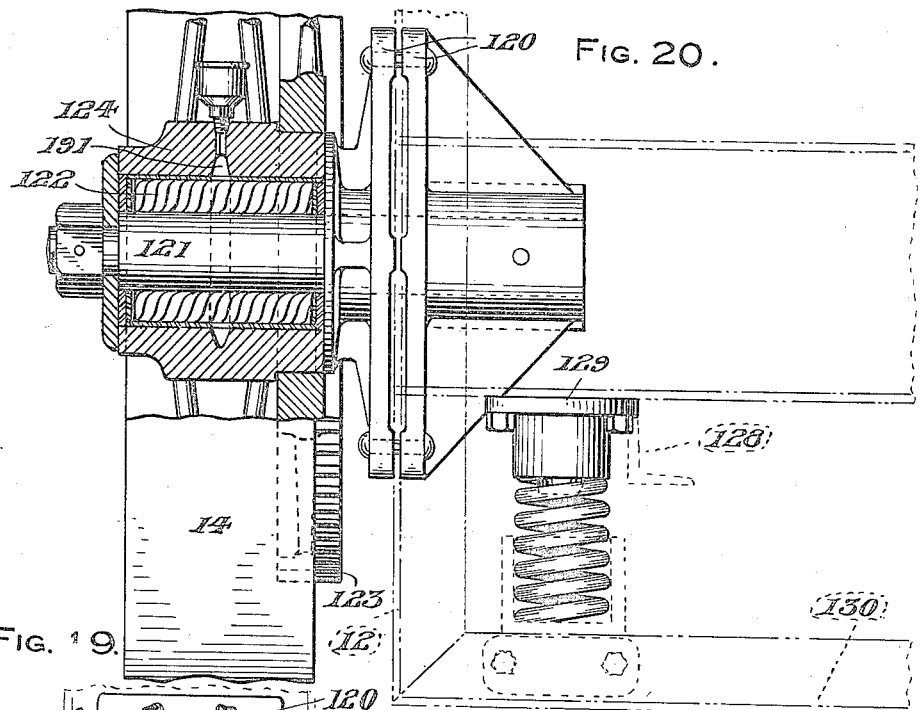
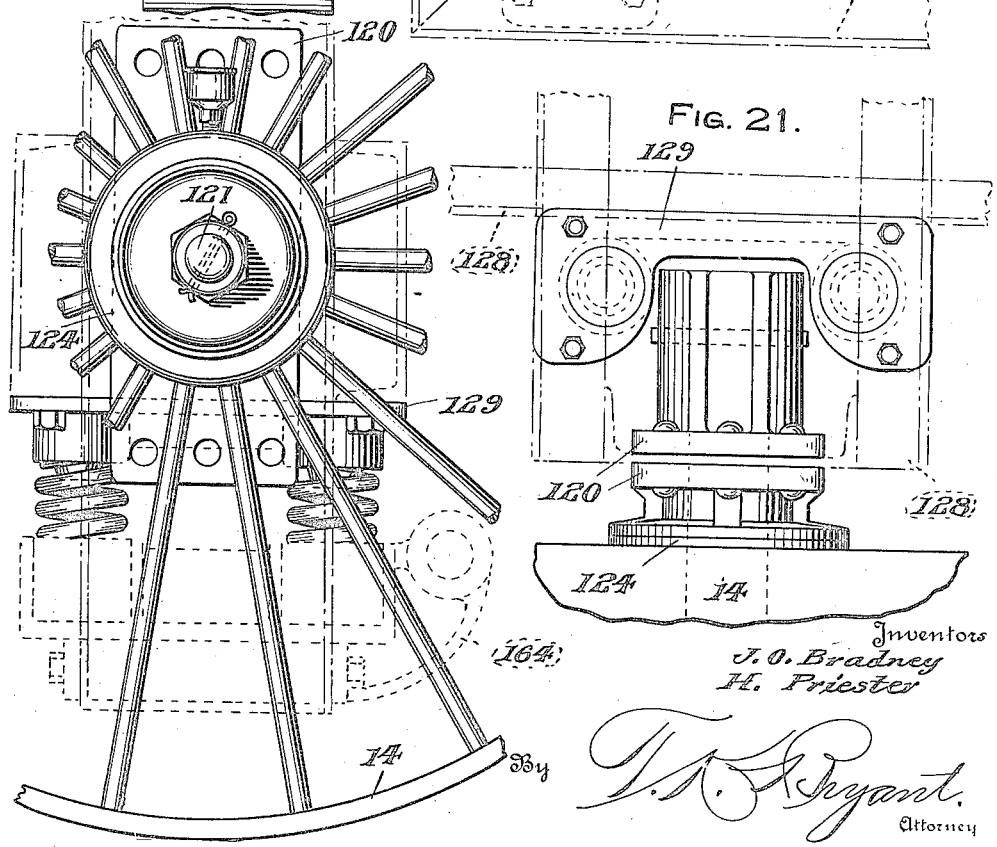

J. O. BRADNEY & H. PRIESTER.
MOTOR OPERATED ADJUSTABLE CONVEYER.
APPLICATION FILED NOV. 3, 1917.

1,301,642.

Patented Apr. 22, 1919.
14 SHEETS—SHEET 14.

Inventors
J. O. Bradney
H. Priester

By T. K. Bryant.
Attorney

UNITED STATES PATENT OFFICE.

JAMES O. BRADNEY AND HENRY PRIESTER, OF MIDDLETOWN, NEW YORK, ASSIGNORS TO BRADNEY MACHINE COMPANY, INC., OF MIDDLETOWN, NEW YORK, A CORPORATION OF NEW YORK.

MOTOR-OPERATED ADJUSTABLE CONVEYER.

1,301,642.          Specification of Letters Patent.      Patented Apr. 22, 1919.

Application filed November 3, 1917. Serial No. 200,120.

*To all whom it may concern:*

Be it known that we, JAMES O. BRADNEY and HENRY PRIESTER, citizens of the United States of America, residing at Middletown, in the county of Orange and State of New York, have invented certain new and useful Improvements in Motor-Operated Adjustable Conveyers, of which the following is a specification.

This invention relates to new and useful improvements in motor operated adjustable conveyers.

The primary object of the invention is provision of a conveyer for any objects, such as packages, bags, and boxes of either small or great weight, arranged for elevating the same to different heights desired, the conveying mechanism being changeable in its direction and readily controlled adjacent either the loading or unloading end of the machine.

A still further object of the device is a provision of an endless conveyer having its opposite ends readily adjustable in height, either being employed for the loading or unloading end, while the adjustments of the operative position of the device is motor operated and the machine is motor driven, the different operations being readily controlled at conveniently located points upon the machine.

Another object of the invention is a provision of a motor propelled and motor driven endless conveyer, the motor of which is also adapted for hoisting the conveying means to different adjustments of inclination, it being possible to simultaneously operate the conveying means, the propulsion mechanism and the hoisting means, while each of the same may be started, stopped and controlled adjacent either the loading or the unloading end of the conveyer.

It is also contemplated to provide a motor driven endless conveyer arranged with self propelled traction means, each of the same being operable in either direction and at varying speeds, while the conveying means is motor adjusted vertically, all of the said movements being either separably or simultaneously operable and under perfect control.

There is also provided in connection with the conveyer, a motor operated stabilizer or shiftable counter-balancing device, employed in connection with the tilting of the conveyer and permitting either the loading or the unloading end thereof to be safely projected free from any immediate support, in such instances, for instance, as when working downwardly from the edge of a dock or from a barge positioned at high tide above the level of the dock.

A means is arranged in connection with the endless conveyer of the device whereby the conveyer belt is maintained in a fixed path of travel regardless of the uneven or incline position of the machine and a portable readily detachable unloader is arranged for ready adjustment at either end of the machine, suiting the angle of travel for the delivered goods to accommodate varying conditions of use.

From the following detailed description it will be seen that there is combined in a single strong and serviceable machine a motor driven truck having speed and direction controlling means at either desired end of the machine; an endless conveyer surrounding an elongated frame upon said truck and operated by the motor thereof, controlled in speed and direction from suitably positioned points; means for bodily elevating the frame upon the truck by the motor thereof for desirably inclining the conveyer for use; steering means for the truck when propelled, operable at opposite sides of the frame; a counter-balancing means shiftable on the frame by the said motor, movable through the plane of the truck; slack adjusting means for the conveyer belt and the counter-balancing means; an adjustably inclined unloader for either end of the conveyer; adjustable supporting struts for the frame; accurate positioning means for the travel of the conveyer belt; incased direction changing and speed changing gears for the conveyer belt; similar incased speed and direction controlling gears for the truck propelling means; similar direction controlling gears for the frame hoisting mechanism; radiating cooling means for the motor longitudinally carried by the frame adjacent the conveyer belt; and conveniently positioned controllers for the said gear mechanisms individually operable at conveniently positioned points upon the frame.

With these general objects in view and others that will appear as the nature of the invention is better understood, the same consists in the novel combination and arrangement of parts, hereinafter fully described, illustrated in the accompanying drawings and pointed out in the appended claims.

For convenience in describing the device it will be noted that a truck is arranged having a carrying frame for an endless conveyer vertically adjusted thereon, the opposite end portions of the frame relatively of the truck being of different lengths and the shorter portion of the frame will be herein termed the rear or loading end of the machine, while the longer portion will be termed the front or unloading end thereof. It must be considered however that the endless conveyer is operatively movable in either direction and that the truck is motor propelled in either direction, so that in actual use, either end of the machine may be the front or rear end thereof as desired as well as the unloading or loading end of the machine as the circumstances require.

In the drawings forming a part of this application and in which like reference characters designate corresponding parts throughout the several views, Figure 1 is a side elevation of the complete device set up for use.

Fig. 2 is an enlarged side elevational view of the hoisting truck portion of the device, upon an enlarged scale.

Fig. 3 is a horizontal sectional view thereof with most of the members shown in top plan view.

Fig. 4 is a top plan view of a section of the front end portion of the device with the conveyer belt broken away.

Fig. 5 is a side elevation of a portion thereof.

Fig. 6 is a side elevation of a portion of the device positioned intermediate the sections thereof shown in Figs. 2 and 5.

Fig. 7 is a side elevation of the rear portion of the device.

Fig. 8 is a top plan view thereof with the conveyer belt broken away.

Fig. 9 is a vertical sectional detailed view taken substantially upon line IX—IX of Fig. 2, upon an enlarged scale, with parts broken away and parts indicated by dotted lines, showing the reversing and propulsion mechanism.

Fig. 10 is a similar vertical sectional view taken upon a plane at right angles to the plane of section of Fig. 9, showing the speed changing and propulsion mechanism.

Fig. 12 is a top plan view thereof with parts removed and parts shown by dotted lines.

Fig. 13 is a top plan view of the balancing weights with the adjacent members, some of the same being indicated by dotted lines.

Fig. 14 is a side elevation thereof.

Fig. 15 is a top plan view of the controlling clutch and mechanism for the balancing device arranged adjacent the rear end of the machine.

Fig. 16 is a side elevation thereof.

Fig. 17 is an enlarged side elevational view of the steering device for the machine.

Fig. 18 is a top plan view of a side portion thereof with the steering handle removed.

Fig. 19 is a side elevation of one of the truck wheels, broken away, and the adjacent mounting portion of the frame with the members indicated by dotted lines.

Fig. 20 is a front elevation of a portion of the same with parts indicated in section, broken away and by dotted lines.

Fig. 21 is a top plan view of a portion thereof.

Fig. 25 is a side elevation of the unloader positioned upon the front end of the machine a portion of the latter being indicated by dotted lines.

Fig. 26 is a top plan view of substantially one half of the mechanism shown in Fig. 25.

Fig. 27 is a vertical sectional view of the adjustable mounting means for the forward struts.

Fig. 28 is a detail view of the disk adjusting means.

Figure 11:
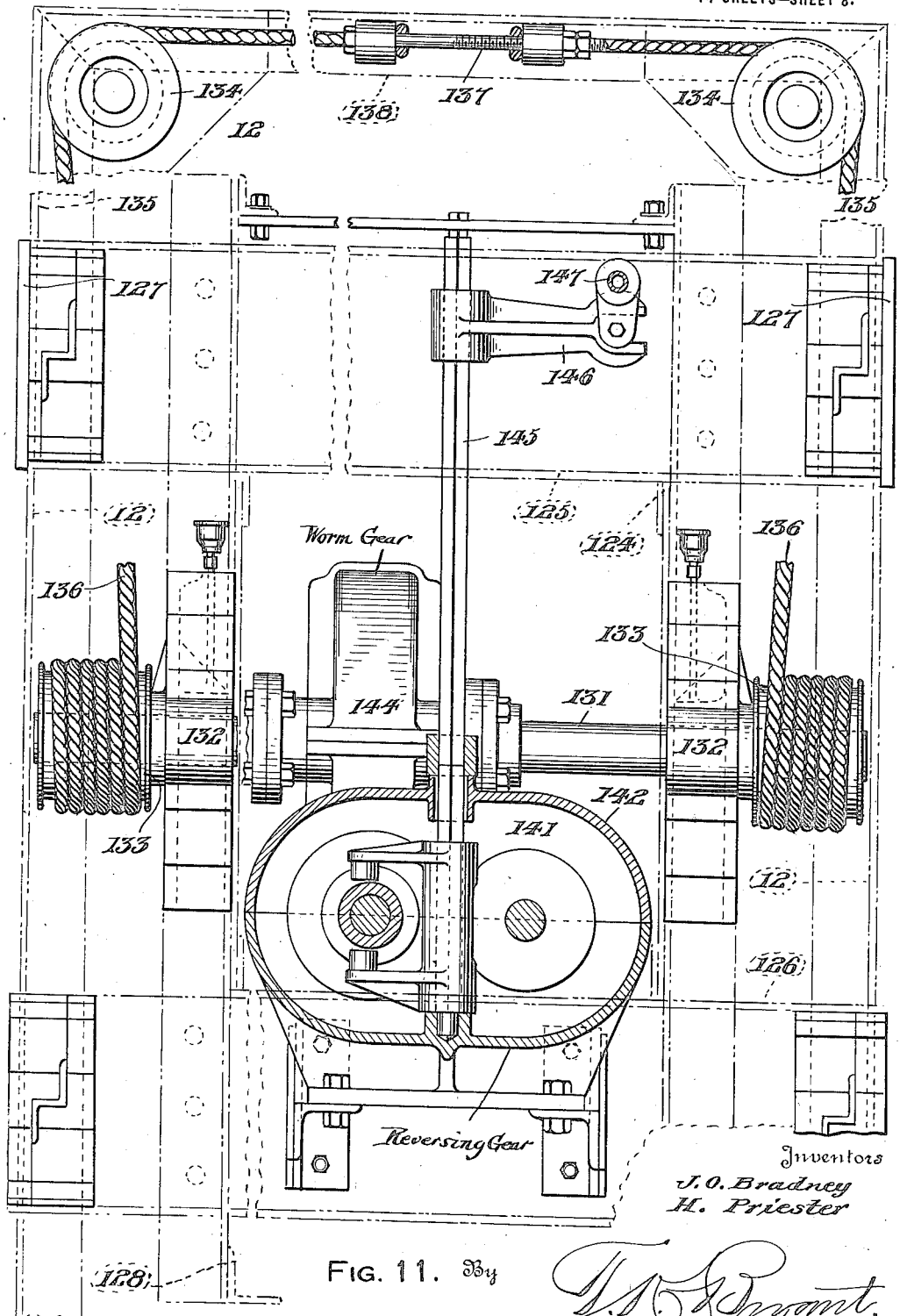
Fig. 11 is a vertical transverse sectional view taken substantially centrally of Fig. 2 with members broken away and shown in dotted lines, illustrating the hoisting mechanism and the direction changing gears therefor.

Referring in details more to the drawings, the invention broadly consists in an elongated mounting frame 10 of metallic truss work formation, substantially triangular in verticle longitudinal section with an endless conveyer belt 11 movably positioned surrounding the frame, while the frame 10 is vertically adjustably carried by a hoisting arch 12 mounted upright on a truck 13 having traction wheels 14 propelled by a motor 15, carried by the frame 10. The shorter section 16 of the machine is positioned rearwardly of the truck 13 and has upright plates 17 (see Figs. 7, 8, 17 and 18) secured at opposite points upon the frame 10 for mounting opposite steering wheels 18 by means of posts 19 journaled in the sleeves 20 carried by the said plates. A steering spindle 21 is secured to the upper end of each post 19 within its sleeve 20 while a spring 22 encircles the spindle within the sleeve and is mounted upon the top of the adjacent post 19 while a ring 23 formed on the plate 17 and through which the spindle 21 extends is seated upon the spring 22. An operating handle 24 is swingingly carried by the upper end of each spindle 21 adapted for normally depending as shown in Fig. 7 but capable of being readily swung horizontally upon its pivot 25 to its operative position as shown in Fig. 17. A link at 26 pivotally connects together the angular forks 27 of the steering wheel 18 and it will be understood that the rear end of the machine is resiliently mounted upon the wheels 18 by means of the spring 22 and that the machine is readily steered when the truck 13 is propelled in either direction, the steering operation being accomplished by either of the handles 24.

A crown faced pulley 28 (see Figs. 1 and 5) is slidably journaled transversely of the rear end of the frame 10 by means of a shaft 29 carried by opposite blocks 30 at the extreme rear end of the frame while a similar pulley 31 is journaled in a slidable block 32 by means of a shaft 33 in the opposite block 34 at the extreme forward end of the frame 10 and the longer or front section 35 of the said frame. The conveyer belt 11, endless in form, completely surrounds the frame 10 passing over the pulleys 28 and 31, being thereby positioned above and below the frame 10, while the upper exposed portion of the belt 11 is adapted for receiving articles to be conveyed in either desired direction the entire length of the frame 10. Steel carrier cleats 36 are transversely arranged suitably spaced apart upon the outer face of the belt 11, being T-shaped in cross section, preferably formed of two angle irons contacting each other. This form of belt 11 permits the carrying of any class of material within the capacity of the belt for conveying and delivering longitudinally of the frame 10 for delivery at any desired height at either end of the machine.

Slack adjusters are arranged for the belt pulleys in the nature of screws 37 swiveled in the blocks 32 and threaded through portions 38 of the frame, turn wheels 39 being carried by the screws for shifting the blocks 32 longitudinally of the guide ways 40 within which the blocks 32 are slidably arranged. Similarly adjusting means may be provided for the opposite pulleys 28 and it will be understood that a shifting of the pulleys by means of the screws 37 will tighten or loosen the belt 11 as found desirable. Supporting means as return roll sets 41 are arranged at suitable intervals transversely beneath the frame 10 being formed of a plurality of rolls 42 secured to a shaft 43 journaled in brackets 44 carried by the lower side rails 45 of the frame 10. It will be understood that the cleats 36 are arranged in spaced sections upon the canvas belt 11 and that the cleat sections freely pass between the rolls 42 as the belt 11 travels over the rolls being supported thereon.

Figure 22:
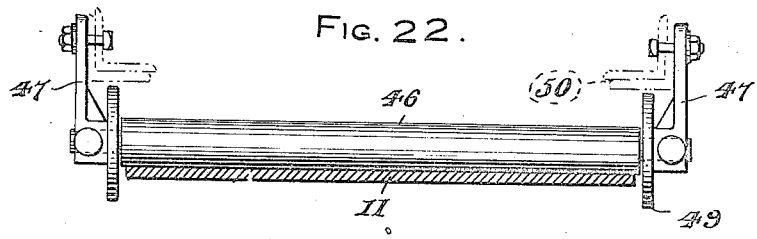
Fig. 22 is a detail elevational view of one of the positioning rollers for the inner face of the conveyer belt.
Figure 23:
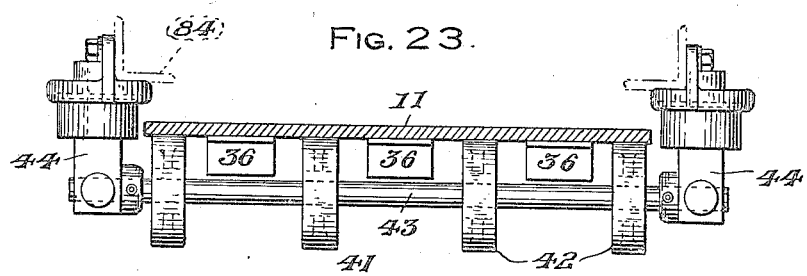
Fig. 23 is a similar view of one set of supporting means for the lower outer face of the belt.
Figure 24:
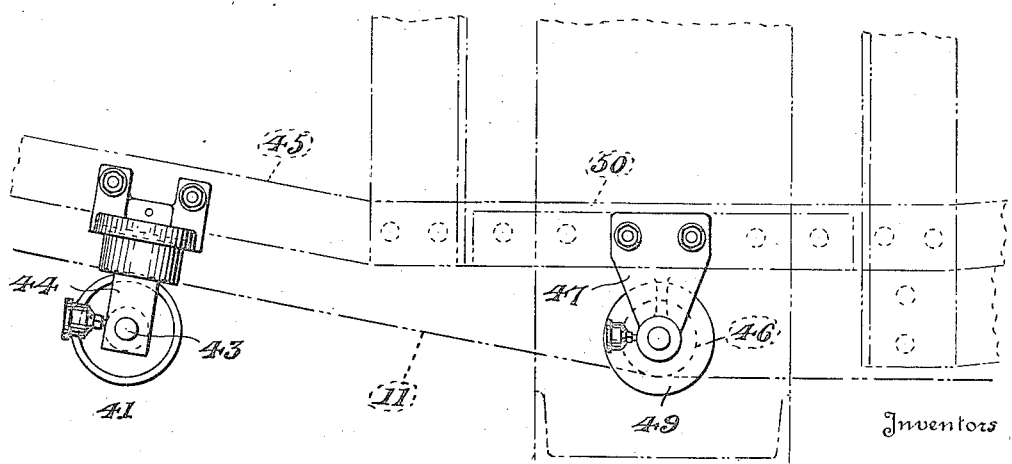
Fig. 24 is a side elevation of one of said supporting means and rollers positioned upon machine's frame, the latter being indicated by dotted lines.

Positioning rollers 46 best illustrated in Fig. 22 are transversely journaled in suitable brackets 47 upon the top rails 48 of the frame 10, the belt 11 being mounted upon the rollers 46 between the circular guides 49 carried by the brackets 47. One of the rollers 46 is also arranged upon the frame 10 between the wheels 14 being at an angular or substantially straightened portion 50 of the lower side of the frame 10, this lower roller 46 however contacting the inner surface of the belt 11 the same as those rollers 46 which are positioned at the upper side of the frame 10. The straight portion 50 of the frame is parallel with the top of the frame and is at the point of separation between the rear section 16 and the front section 35 of the machine; it being understood that the lower roller 46 at the said straight portion 50 of the frame 10 prevents the belt 11 from contacting the frame at that point and maintains the belt in contact with those supporting or return roll set 41 arranged at opposite sides of said straight portion 50.

Oppositely arranged grooved guide disks 51 (see Figs. 1, 4, 5, 7 and 28) in the form of flat pulleys are mounted parallel to the travel of the belt 11, attached to the frame 10 as at 52 at the top and bottom thereof and adjacent each of its ends, adapted for receiving the opposite edges of the belt 11 in the grooves of each opposite pair of disks 51 thereby holding the belt true for traveling over the belt pulleys 28 and supporting roll sets 41 under all conditions of ground or floor levels upon which the machine is positioned. Adjusting nuts 53 are carried by the axles 54 of the disks 51 for adjusting the disks in their brackets 52.

*Conveyer belt operating means.*

A motor, either electric or explosive, is provided for driving the different mechanism of the device and is herein illustrated at 15 as an explosive motor having a drive shaft 55 arranged with a balance or fly wheel 56 (see Figs. 7 and 8) at one end thereof. The other end of the motor shaft 15 leads to the differential casing 57 for operative connection with oppositely extending driving shafts 58 and 59 projecting forwardly and rearwardly respectively of the frame 10.

The rearwardly extending shaft 59 is arranged with direction reversing means including a friction clutch of the form hereinafter described in connection with the hoisting and propulsion mechanism and arranged within the casing 60. A shaft 61 extends rearwardly from the reversing mechanism 60 having universal driving connections 62 at its opposite end and leads to the speed change mechanism 63. A driven shaft 64 is journaled transversely of the frame 10 within bushings 65 carried by centering devices 66 on the plates 17. Worm and shaft connections are provided in the casing 67 between the speed change mechanism 63 and the shaft 64. A sprocket wheel 68 is arranged upon each opposite end of the shaft 64 with a sprocket chain 69 passing over a similar sprocket wheel 70 upon the adjacent end of the axles 29 of the rear pulley 28.

It will be understood that the driving connection just described between the motor 15 and the rear pulley 28 drive the conveyer belt 11 in either direction under the control of the mechanism 60 and also at desirable speeds controlled by the mechanism 63.

The speed change mechanism 63 has a controller or lever 71, having a central neutral position and adapted for providing different speeds of drive between the shafts 61 and 64, when the lever 71 is at the forward and rear extremities of its shifting movement. A resilient retaining rod 72 depends from the lever 71 adapted for engaging at different points of a retaining toothed rack 73 and thereby maintaining the lever 71 in position when adjusted until manually shifted to a different position for changing the speed of the conveyer belt 11.

A squared turn shaft 74 is arranged for controlling the reversing mechanism 60 and has an operating lever 75 having a loose connection with an operating rod 76 arranged longitudinally of the frame 10. A transverse shaft 77 (see Figs. 4 and 8) is arranged adjacent the opposite ends of the frame 10, each of said shafts 77 having a hand lever 78 at each opposite end thereof at the opposite sides of the machine while loose connections 79 are arranged between the shafts 77 and the reversing shaft 76.

From this description it will be seen that while the speed of the conveyer belt 11 is controlled at a point adjacent the rear end of the machine by means of the lever 71, the belt 11 may be started and stopped as well as the direction thereof changed by means of the mechanism 60 controlled from either side of the machine and adjacent either end thereof by the conveniently positioned levers 78.

A cooling system is arranged for the motor 15 comprising coils 80 arranged within the frame 10 longitudinally thereof and beneath the upper ply of the conveyer belt 11 the same being connected to the water jacket of the motor 15 as at 81. It will be understood that the coils 80 are of the required extent to provide the desired amount of radiation for cooling the motor 15.

*Counter-balancing mechanism.*

The entire frame 10 may be substantially balanced upon the truck 13 and a counter-balancing mechanism is arranged, whereby either end of the machine may be elevated or lowered as the occasion may require for loading and unloading the goods which are conveyed by the machine. A plurality of substantially rectangular weights 82 (see Figs. 13 and 14) connected together in a unit by rods 83 are slidably arranged at the bottom of the frame 10 upon opposite lower angle bars 84 forming the lower rails of the frame 10. An operating chain 85 for the weights 82 is connected to the opposite ends thereof as at 86, while the chain 85 is looped at one end for traveling over a sprocket wheel 87 arranged forwardly upon the frame 10 substantially midway of the length of the forward section 35 thereof. The wheel 87 (see Fig. 6) is mounted upon a slack adjuster 88 having an idler wheel 89, an adjusting screw 90 being arranged for the adjuster 88.

The central portion of the chain 85 is adapted for freely sliding within a central groove 91 of the weights 82 while a positioning plate 92 is transversely carried by the frame bars 93 of the frame 10 above the chain and weight, thereby maintaining the chain 85 in the groove 91 during the longitudinal movement of the weight 82 by means of the chain 85 (see Figs. 15 and 16).

The chain 85 is looped at its rear end over a sprocket wheel 94 arranged upon a shaft 95 journaled in brackets 96 arranged upon the frame 10 adjacent the rear pulley 28. Spaced brackets 97 position an idler sprocket wheel 98 engaging the upper lap of the chain 85 and it will be evident that upon turning the shaft 95 in either direction, the weight 82 will be slidably moved longitudinally of the frame 10 for shifting the center of gravity thereof and permitting the desired end of the machine to be suitably lowered. A sprocket wheel 99 upon the belt driving shaft 64 is operatively connected by means of a chain 100 with a sprocket wheel 101 freely journaled upon the shaft 95. A clutch member 102 is slidably splined upon the shaft 95 adjacent a clutching portion 103 of the wheel 101, a rod 104 being attached to the clutch member 102 for moving said member into engagement with the wheel clutch 103.

A spring 105 maintains the clutch 102 out of engagement with the member 103 while a hand lever 106 is carried by a vertical shaft 107 having a loose link connection 108 with the rod 104 and whereby the said rod may be moved longitudinally for closing the clutch members 102 and 103 together.

The lever 106 is the sole means for controlling the shifting of the counter-balancing weight 82 and is conveniently located adjacent the rear end of the machine. The shaft 95 being moved by the shaft 64, it will be understood that the weights 82 can be shifted only when the conveyer belt 11 is running but this offers no disadvantage and the speed of movement of the weights 82 as well as their direction of movement longitudinally of the frame 10 is controlled by the speed change and direction controlling mechanism 63 and 60 respectively of the conveyer belt, so that the direction of movement of the weight 82 may be controlled at either end of the machine by either of the levers 78.

An adjustable strut 109 (see Figs. 1, 6 and 27) in the nature of a supporting leg is arranged at each side of the frame 10 upon the forward section 35 thereof adjacent the adjuster 88 of the counter-balancing chain 85. The leg 109 is slidably arranged within a sleeve 110 and has a plurality of notches 111 upon one edge thereof adapted for ratcheting over a double pawl 112 pivoted to one side of the sleeve. A handle 113 is carried by the pawl 112 normally serving as a weight to maintain the lower end 113 of the pawl in contact with the leg 109. It will be understood that a wheel 115 upon the bottom of the leg normally rests upon the ground or other support 116 for the machine and that upon elevating the forward end section 35 of the frame 10, the opposite legs 109 will remain in their supporting position, the lower end of the pawl 112 automatically seating within the adjacent notch 111 thereby forming a rigid support for the adjacent portion of the frame 10.

Set screws 117 are arranged through the sleeve 110 for tightening upon the adjacent leg 109 for strengthening its holding means when desired. An upwardly inclined notch 118 is arranged in the leg 109 adjacent its lower end and above the wheel 115, which notch is adapted to receive the upper end 119 of the pawl 112 when the leg is elevated to its extreme position, the pawl 112 being manually shifted for accomplishing this engagement by means of a handle 113. The legs 109 may be carried in this manner elevated and when released by the handle 113 will automatically drop to their supporting positions operatively maintained by their pawls 112.

*Frame hoisting mechanism.*

The hoisting arch 12, heretofore referred to, is rectangular in form and has the truck wheels 14 mounted on its opposite sides by means of securing plates 120 (see Figs. 19, 20 and 21) which support the axles 121 of the said wheels at opposite sides of the arch 12. Suitable anti-friction bearings 122 are provided for the wheels 14, while a toothed rack or gear 123 is secured to the hub 124 of each wheel, upon the inner side thereof and adjacent the lower end of the arch 12. A substantially central portion of the frame 10 is arranged within the arch 12 having cross beams 125 adjacent its upper end and similar beams 126 adjacent its lower end, the said beams having projecting ends extending adjacent the front and rear edges of the opposite sides of the frame 12 or arch, for guiding the frame 10 in its vertical movements within the arch. End caps 127 are secured to the ends of the beam 25 outwardly of the arch 12 while opposite depending portions 128 of said central portion 124 are adapted for positioning upon adjacent resiliently mounted blocks 129 carried by the bottom cross-piece 130 of the arch 12 when the frame 10 is in its normal lowered position with the lower beams 124 seated upon the said blocks 129.

A winding shaft 131 is journaled in brackets 132 of the frame portion 124 having drums 133 upon its opposite ends within the arch 12 and between the beams 125 and 126. Pulley wheels 134 are journaled within the upper corners 135 of the arch 12 and a cable 136 having a take up device 137 beneath the top cross-piece 138 of the arch has its opposite ends wound upon and secured to the drums 133. It will be understood that by turning the shaft 131 in the required direction for winding the cable 136 upon the drums 133, the frame 10 will be elevated in the arch 12 to the desired elevation while the turning of the shaft 131 in the opposite direction will unwind the cable 136 permitting the frame 10 to lower within the arch for seating upon the blocks 129.

The shaft 58 of the motor 15 is connected by a universal joint 139 (see Fig. 12) with the driving shaft 140 of direction changing gear mechanism 141 having a casing 142 and a controlling clutch 143 of the form known as a friction clutch and whereby the starting, stopping and direction of rotation of the shaft 131 and the winding drum 133 is controlled, it being understood that the transmission connections are arranged within the casing 144 between the gears 141 and the shaft 131.

A controlling rod 145 (see Figs. 1, 2, 4, 11 and 12) for the direction changing gear's clutch 143 is arranged with a fork 146 connected to a controlling shaft 147 arranged longitudinally of the frame 10 parallel with the belt controlling shaft 76 and having similar controlling levers 148 operatively linked thereto as at 149 at opposite ends of the machine and at opposite sides thereof, adjacent the said levers 78.

It will be understood that the clutch 143 is normally in a neutral position so that the turning of the shaft 140 will not move the winding shaft 131 but when it is desired to elevate the frame 10 within the arch 12, any one of the four levers 148 may be manually moved in the required direction to operate the clutch 143 for connecting up the shaft 131 with the shaft 140 for turning the drums 133 in the desired direction. It will be understood that a worm wheel and worm, not shown, constitute the connections within the casing 144 whereby the frame 10 will maintain its adjusted position when elevated until operatively lowered by the shaft 140 and requiring the shifting of one of the levers 148 for accomplishing the return lowering movement of the frame 10.

The frame 10 may be elevated in this manner for affording the desired inclination for the work at hand and with either end of the machine elevated as desired, the counterbalancing mechanism being operated accordingly for shifting the weights 82 as found desirable.

Propulsion mechanism.

The propelling of the truck 13 in either direction by means of the motor 15 is accomplished by suitable driving connections for the ground wheels 14 and includes direction changing mechanism 150 within a casing 151 and a speed changing mechanism 152 within a casing 153. The shaft 140 leading from the direction changing mechanism 141 of the hoisting mechanism is connected by a stub shaft 154 with the direction changing mechanism 150, the latter including a friction clutch 155 (see Figs. 9 and 10).

The driven shaft 156 leading from the gears 150 is operatively connected by sprocket connections 157 with a shaft 158 journaled in a bracket 159 and leading to differential mechanism within a casing 160, whereby the shaft 158 is operatively connected with opposite driving spindles or axles 161 journaled in the brackets 159 transversely of the frame 10.

Each spindle 161 has a beveled gear 162 upon its free end in constant mesh with its similar gear 163. Brackets 164 are secured at opposite sides of the lower end of the arch 12 each of which journals a stub shaft 165 having a beveled gear 166 secured thereto within a housing 167 and also arranged with a pinion 168 in constant mesh with the gear 123 of the adjacent ground wheel 14 at that side of the truck. A suitable housing 169 is preferably arranged for the gears 123 and 168 as shown in Fig. 2 of the drawings. An upright shaft 170 is journaled through the top of the housing 167 with a beveled gear 171 secured to the shaft 170 in mesh with the similar gear 166. The shaft 170 is angular in cross section and the gear 163 is slidably mounted thereon so that during the vertical movement of the frame 10, the gears 163 slide upon their respective shafts 170 permitting the transmission of power to the ground wheels 14 from the spindles 161 at any vertical adjustment of the frame 10.

By controlling the direction changing mechanism 150, the truck 13 may be propelled in either desired direction while it will be understood that the speed changing mechanism 152 is operatively associated with the shaft 156 whereby the speed of travel of the machine when driven by the motor 15 is also controlled, the clutch 155 serving the purpose of starting and stopping the travel of the machine. A controlling shaft 172 is arranged for the clutch 155 having a suitable connection 173 with a controlling shaft 174 of similar arrangement to the controlling shafts 76 and 147. Adjusting levers 175 (see Figs. 1, 4, 5, 7 and 8) are provided for the shaft 174 arranged adjacent opposite ends of the frame 10 and at opposite sides thereof positioned intermediate the said levers 78 and 148.

The speed changing gears 152 have a controlling shaft 176 connected by a fork 177 with an adjusting shaft 178 similarly arranged with respect to the shaft 174 and having a controlling lever at the opposite sides and adjacent the opposite ends of the frame 10 if desired, such levers being herein shown at 179 connected to the shaft 178 as at 180 (see Fig. 8), the levers 179 being spaced from the rear end of the machine and adjacent the belt controlling levers 78.

It will be seen that the speed of the machine in its travel is controlled by the levers 179 while its direction and starting and stopping of the travel thereof is controlled by the levers 175 at either end of the machine, while its travel at different speeds and in different directions is possible while the frame 10 is positioned at any desired elevation in the arch 12 as well as inclination under the control of the counter-balancing mechanism.

Unloading device.

An unloading device especially adapted for this conveyer is illustrated in Figs. 25 and 26 of the drawings operatively attached to one end of the machine, it being noted that the unloader is readily removable and may be attached to either end of the machine.

A slide or chute 181 is arranged with projecting hooks 182 at one end thereof adapted for mounting upon the axle of either of the pulleys 28. A notched angular rack 183 is pivoted at each side of the board 181, the teeth of which are adapted to engage over pins 184 carried by the side of the frame 10 adjacent the opposite end. Operating rods 185 are arranged for the rack 183 connected by a crank 186 with a shaft 187 journaled beneath a board 181 and having an operating handle 188 at each end thereof.

It will be understood that when the unloader 181 is operatively arranged as herein shown, the handles 188 may be operated for adjusting the rack 183, thereby positioning the board 181 at the desired inclination. The unloader may be readily attached from the machine by disconnecting the rack 183 and the hook 182 and then changed from one end of the machine to the other and positioning at the unloading end thereof for discharging the goods deposited upon the board 181 by the apron 11 or belt. Suitable projections 189 are arranged at the near end of the board 181 for permitting the cleats 36 of the belt 11 to pass therebetween.

It will be seen that in this manner the goods from the belt 11 will pass downwardly upon the inclined board 181 and discharged off of the free end 190 thereof.

From this detailed description of the device it will be seen that large quantities of heavy goods may be quickly and easily handled, the entire mechanism being under the complete control of the operators at convenient points.

Further specific description and detailed illustration of the working parts of the speed and direction changing mechanism, together with the clutches thereof, is unnecessary, in view of only their broad inclusion in the protection afforded by this application. It will be understood, however, that the friction clutches, of the direction changing mechanisms will normally stand at neutral so that the engagement of the clutch effects the starting of the mechanism in the desired direction while the returning of the clutch to its neutral arrangement stops the movement of the mechanism by interrupting its transmission means. The points for control for the various mechanisms at four positions upon the frame 10, at opposite sides thereof and adjacent its opposite ends are important factors in the practicability of the machine but it will be understood that a single controller only may be arranged for each of the same if desired. Certain elements not herein specifically described will be noted however in the drawings such as the lubricating system for the drive wheels including the annular space 191 in the hub 124.

While the form of the invention herein shown and described is what is believed to be the preferred embodiment thereof, it is nevertheless to be understood that various forms, modifications and arrangements of parts may be made without departing from the spirit and scope of the invention as claimed.

What we claim as new is:—

1. A conveyer comprising a truck, a vertically shiftable frame upon the truck, an endless conveyer upon the frame, positive elevating and lowering means for the frame, controlling means for the elevating and lowering means extending to points adjacent the opposite ends of the frame and actuating means for each end of the controlling means arranged at opposite sides of the frame.

2. In combination with a truck, a conveyer frame substantially balanced thereon, hoisting and lowering means for the frame, and counterbalancing means shiftable longitudinally of the balancing portion of the frame whereby the latter may be tilted at different inclinations.

3. In combination with a truck, a conveyer frame substantially balanced thereon, hoisting and lowering means for the frame, counterbalancing means for the frame shiftable longitudinally adjacent the bottom of the substantially central portion thereof, whereby the frame may be tilted at different inclinations, an endless conveyer belt upon said frame, and simultaneous operating means for said belt and counterbalancing means.

4. In combination with a truck, a conveyer frame substantially balanced thereon, hoisting and lowering means for the frame, counterbalancing means for the frame shiftable longitudinally within the lower portion of the frame, an endless conveyer belt upon said frame, simultaneous operating means for said belt and counterbalancing means, a motor upon the frame, speed and direction changing connections between the said motor and said belt and counterbalancing means.

5. In combination with a truck, a conveyer frame substantially balanced thereon, hoisting and lowering means for the frame, slidable counterbalancing means upon the frame, an endless conveyer belt upon said frame, simultaneous operating means for said belt and counterbalancing means, a motor upon the frame, speed and direction changing connections between the said motor and said belt and counterbalancing means, direction changing connections between the said motor and said hoisting and lowering means and speed and direction changing propulsion means for the truck operatively connected to said motor.

6. In combination with a truck, a conveyer frame substantially balanced thereon, hoisting and lowering means for the frame, counterbalancing means longitudinally shiftable upon the frame, an endless conveyer belt upon said frame, operating means for said belt and counterbalancing means, a motor upon the frame, speed and direction changing connections between the said motor and said belt and counterbalancing means, direction changing connections between the said motor and said hoisting and lowering means, speed and direction changing propulsion means for the truck operatively connected to said motor, separate controllers for the lowering and elevating means, and for the direction changing means for the belt arranged adjacent the opposite ends of the frame and at opposite sides thereof.

7. A truck conveyer having an endless traveling belt, propelling means for the truck and belt, reversing gears for the truck and belt, and separate controllers for the said gears for controlling the direction of travel of the truck and belt arranged in pairs at the opposite ends of the machine.

8. A balancing means for conveyer frames comprising a plurality of weights slidably carried upon the frames, sprocket wheels upon the frame spaced from the opposite ends of the weights, a chain having its ends attached to the weights and traveling over the said sprocket wheels with an intermediate portion of the chain slidably positioned in contact with the weights and operating means for one of said sprocket wheels.

9. A balancing means for conveyer frames comprising a plurality of weights slidably carried upon the frames, sprocket wheels upon the frame spaced from the opposite ends of the weights, a chain having its ends attached to the weights and traveling over the said sprocket wheels with an intermediate portion of the chain slidably positioned in contact with the weights, a slack adjuster for one of the said sprocket wheels, a driving shaft for the conveyer arranged adjacent the other sprocket wheel operatively connected therewith and controlling means for the said connections arranged at one side of the frame and adjacent one end thereof.

10. In combination with a conveyer having an elongated substantially balanced frame, an endless traveling belt upon said frame, driving means for said belt, a plurality of connected weights slidably arranged upon the bottom of the frame adapted for travel longitudinally thereof, a sprocket wheel adjacent one end of the frame operatively associated with the belt driving means, a slack adjusting sprocket wheel arranged in spaced relation with the opposite end of the frame, the said weights arranged with a central groove extending the length thereof, a guide plate carried by the frame above the weights overlying said groove, and a pull chain for the weights running over the said wheels with its intermediate portion slidably arranged within the said groove between the said weights and plate and connections between the free ends and the opposite ends of the said weights.

11. A conveyer comprising a truck having ground wheels, a conveyer supporting frame vertically shiftably arranged upon the truck, a motor, operative connections between the said motor and ground wheels, adapted for operation when the frame is in its adjusted position, speed and direction changing mechanisms for said driving connections and controlling means for each of said mechanisms arranged adjacent the opposite ends of the frame at opposite sides thereof.

In testimony whereof we affix our signatures.

JAMES O. BRADNEY.
HENRY PRIESTER.